UNITED STATES PATENT OFFICE.

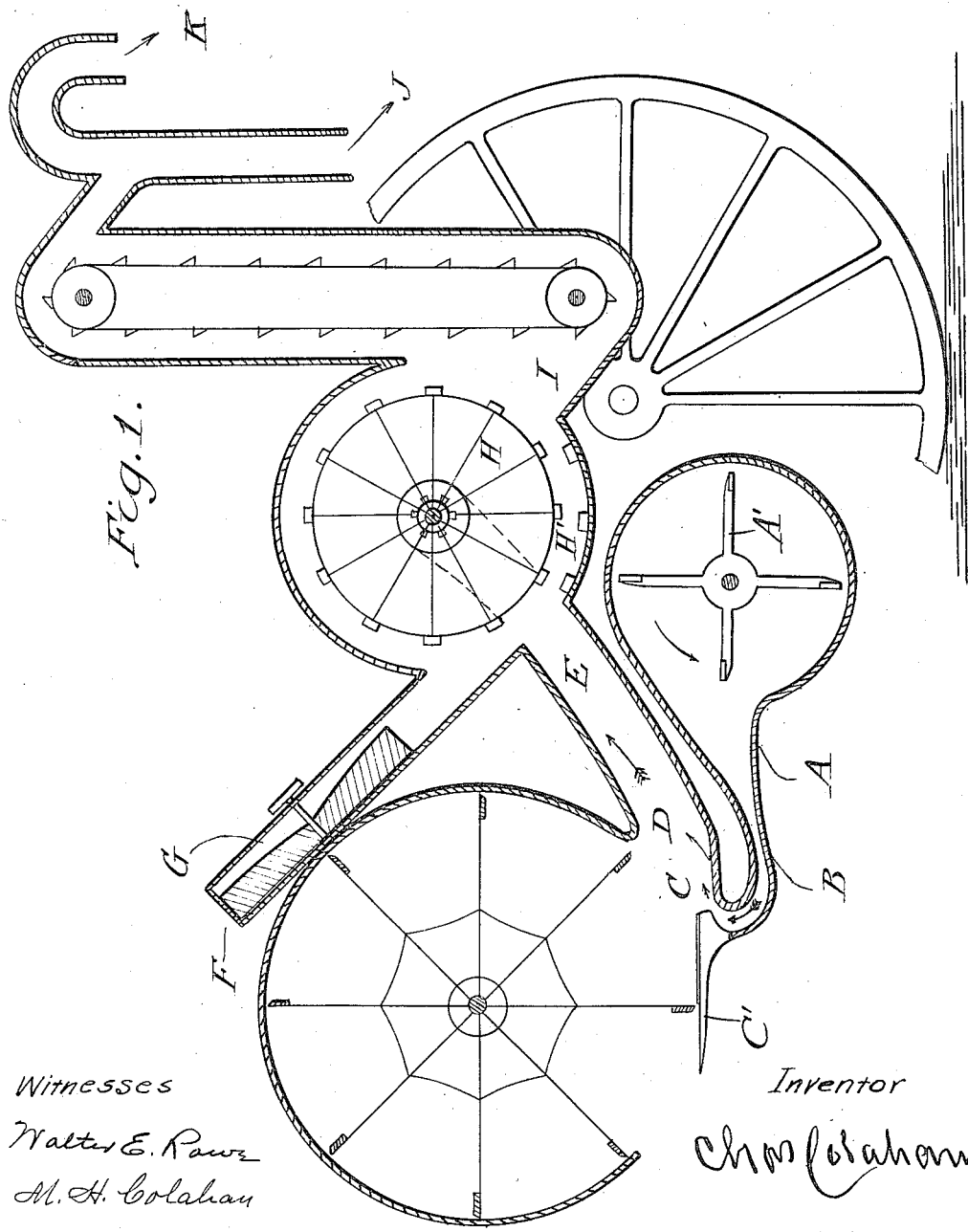

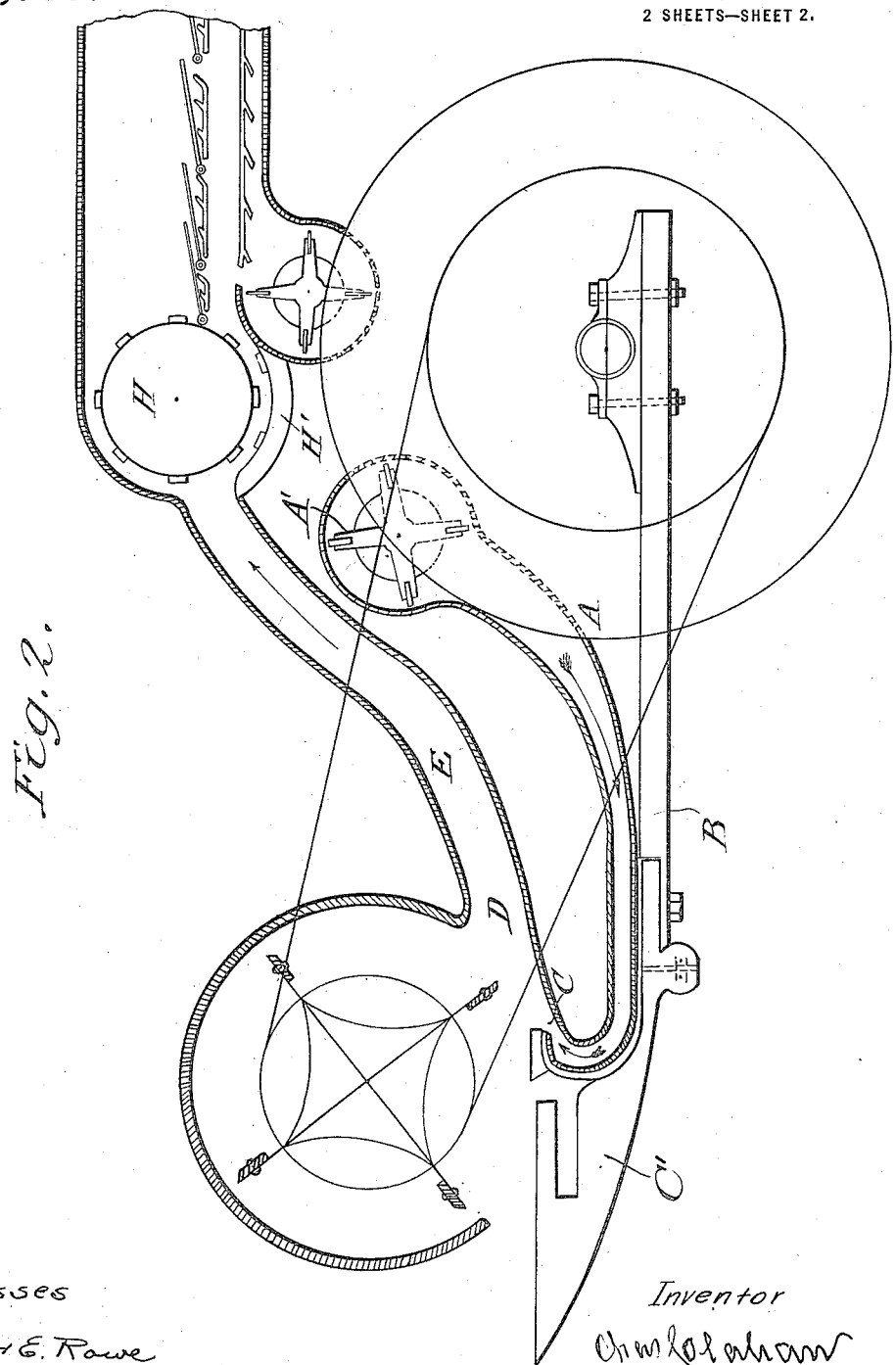

CHARLES COLAHAN, OF STOCKTON, CALIFORNIA.

GRAIN-HARVESTER.

1,146,785.  Specification of Letters Patent.  Patented July 20, 1915.

Application filed January 31, 1914. Serial No. 815,654.

*To all whom it may concern:*

Be it known that I, CHARLES COLAHAN, a citizen of the United States, and residing at Stockton, in the county of San Joaquin and State of California, have invented certain new and useful Improvements in Grain-Harvesters, of which the following is a specification, reference being had to the accompanying drawings, forming a part thereof.

My invention relates to grain harvesters, and pertains to the novel means used in the operation to secure, in harvesting all the grain from the standing straw in the field without liability of scattering or losing any part, and bring the grain and chaff within an inclosed receptacle or passage way, over and through which it is forced by controllable atmospheric means, so applied as to take in and secure the grain, forcing it through the passage way leading therefrom.

The object of this invention, is to save the farmer the time, labor and waste of grain involved in the present method of harvesting, and avoid the expense incident to the many and separate handlings incurred in harvesting, binding in bundles, shocking, stacking, and threshing, that requires the labor of handling the straw a number of times, and the losses incurred in such work, or by exposure to atmospheric influences.

In providing the means to accomplish my object in a machine of this class, in gathering and threshing the grain from the field in one operation, I have found it necessary to produce an air current to draw in, and gather, the heads of grain as it enters the inclosed passage way of the receiver, and is severed from the standing straw. I provide the means for this purpose by having an air conduit entering the inclosed passage way of the receiver at its base at a point directly in rear of the cutting apparatus. This air conduit has an opening or inlet extending the entire width of the grain receiving platform within the inclosed passage way, directing the air upward, also creates an air current that enters at the mouth of the receiver over the cutter bar and draws in the grain and chaff at the front. This air conduit directs the air current obliquely upward tangential with the lower plane of the surface of the inclosed passage way of the receiver and grain platform, forcing the grain and chaff therethrough to the threshing receptacle in a continuous delivery as the machine is advanced in harvesting. The devices producing this air current are regulated by any common means used to increase or decrease its volume or force, as it must be positive in creating a draft of sufficient power to draw in and force the incoming grain obliquely upward through the passage way, and deliver it therefrom, without being subjected to an outside blast or action of a reel or a fan and its beating vanes that would scatter the grain, and also cause it to shell out and be lost from the standing straw before it enters the receptacle. This grain head and chaff is carried upward by said air current in its passage through the receptacle, and acted upon by an auxiliary forcing blast of air produced by a centrifugal fan located on the outside at the top of the passage way, in line with the threshing cylinder and its concave, to increase the power of the intaking current of air at the base of the receptacle, also acting to directly force the grain and chaff outward therefrom. By this arrangement of devices, I am enabled to secure every kernel of the grain in harvesting the crop, and there is no scattering waste or loss whatever, which is a great advantage over present methods, and more than pays the cost of harvesting.

It is a well known fact admitted by all growers of grain, that this improved method of harvesting has many advantages, as the soil is impoverished by the entire removal of the straw, as is done in the present method of harvesting, and its fertility is improved by leaving the straw on the field, to be plowed under in cultivation.

The grain and chaff passing between the cylinder and its concave is thoroughly separated, and deposited in the grain elevator, which is inclosed in a casing that admits the chaff passing through and out, and the grain will fall by gravity through the bag spout thoroughly cleaned and ready for market.

In the drawings, Figure 1 represents a sectional side elevation of a machine embodying my invention, showing a spiral revolving knife cutting cylinder, commonly used with front cut thrust driving machines, for which I make no claim, as any form of cutting or other apparatus may be used in removing the head from the standing straw, which head and chaff is deposited upon the platform within the passage way of the grain receiver. This figure also shows the air current-producing fan, its condensing conduit entering the receiving platform at its base, in rear of the cutting apparatus, and directing a current of air obliquely upward to take in the grain and chaff, and cause it to move upward and through the passage way of the receptacle, where it is acted upon by the coöperating auxiliary blast current of air created by the centrifugal fan, and forced into the threshing cylinder and through the separating devices. Fig. 2, is a similar elevation or modified plan, from which the centrifugal fan is omitted.

A represents the outer inclosing case of the exhaust air current-producing fan A'. B its condensing conduit that enters the receptacle from underneath. C, the inlet or opening entering the base of the receiver D, in rear of the cutter bar C' or its knife guard.

E is the inclosed passage way to the threshing cylinder. F, the centrifugal fan casing, G, its fan, mounted on a central shaft which is actuated in any usual manner common to such fans.

H is the threshing cylinder within its usual inclosure. H' its concave, arranged beneath the cylinder, each having its corresponding threshing teeth, common thereto.

I is the grain receptacle, from which the grain is elevated by the usual grain carrying belts, and is provided with an outer casing to confine the chaff, which is blown upward and outward through the curved spout K.

J is the grain discharging spout.

The requirements and operation of the several parts are clearly shown and do not need an extended description.

The invention may be applied to side draft frames or push machines, with either animal or motor power, as has been demonstrated by practical field operation, the machine being constructed for tilting, or raising and lowering by any well known means, to meet requirements of the harvest field when in use. As it may be seen, the machine is advanced against the standing grain, removing the head and chaff, which is deposited within the receiver D and its passage way, that extends wholly across the front end of the platform. The positive intaking air current that gathers in the heads of grain at the cutter bar, is increased in volume and force by the coöperating auxiliary blast-current created by the centrifugal fan at the top, and keeps the inclosed passage way free from obstruction and clogging of the incoming straw and chaff, and as a blast, adds to the requirements of the mechanism, to force the grain and chaff therethrough.

What I claim as my invention and desire to secure by Letters Patent, is:

1. In a harvesting machine, the cutter bar, the receiver, the inclosed passage way provided with an air conduit entering the receiver at its base in rear of the cutter bar, combined with means to force the air current upward through the inclosed passage way and also to produce an intaking air current to gather the heads of grain as it is severed from the standing straw, forcing the same through the passage way to the threshing cylinder substantially as shown.

2. In a harvesting machine the cutter bar, the receiver, the fan A', the inclosed passage way provided with an air conduit entering the receiving conduit at its base in rear of the cutter bar, thus providing means to gather the incoming grain and chaff, and force the same upward from the receiver through the inclosed passage way, combined with the centrifugal fan located outside at the top thereof, producing an auxiliary air current, thereby augmenting the power and volume of the intaking current at the base of the receptacle and providing a blast at the top thereof to force the grain and chaff therefrom.

3. In a harvesting machine, the cutter bar, the receiver provided with an air conduit entering therein at the base in rear of cutter bar, and means for producing an intaking air current whereby the standing straw is inclined to the cutter bar, said current also forcing the severed grain and chaff upward through the inclosed passage way, combined with means to produce an outside cross current blast at the top of the passage way, to augment its intaking and discharge force.

4. In a harvesting machine including a cutter bar, the receiver, a fan producing a current of air entering the receiver at base in rear of cutter bar, said current inclining the standing grain against the cutter bar, and also forcing the severed heads upward, combined with a centrifugal fan positioned outside the head of the receiver and passage way to provide an auxiliary blast forcing the grain and chaff therefrom.

5. In a harvesting machine including a cutter bar, a grain elevating passage way having means to provide an intaking air current at the base of the platform in rear of the cutter bar, to move the grain and chaff obliquely upward through the inclosed passage way, combined with an auxiliary blast fan at the top of the passage way to increase its suction power and provide a direct outward blast in line with the plane of its discharge terminal.

CHAS. COLAHAN.

Witnesses:
M. H. COLAHAN,
F. L. SNYDER.